US011442547B1

(12) United States Patent
Richard

(10) Patent No.: US 11,442,547 B1
(45) Date of Patent: Sep. 13, 2022

(54) SOFTWARE DEFINED HARD KEYS LEVERAGING FLEXIBLE DISPLAY HARDWARE TO ACHIEVE HAPTIC DISPLAY SOLUTION

(71) Applicant: Rockwell Collins, Inc., Cedar Rapids, IA (US)

(72) Inventor: Lyle Richard, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/315,734

(22) Filed: May 10, 2021

(51) Int. Cl.
| | |
|---|---|
| *G06F 3/01* | (2006.01) |
| *H04R 1/02* | (2006.01) |
| *B64D 43/00* | (2006.01) |
| *G06F 3/041* | (2006.01) |

(52) U.S. Cl.
CPC ............ *G06F 3/016* (2013.01); *B64D 43/00* (2013.01); *H04R 1/02* (2013.01); *G06F 3/041* (2013.01); *G06F 2203/04102* (2013.01); *H04R 2499/15* (2013.01)

(58) Field of Classification Search
CPC ............ G02B 27/01; G02B 2027/0138; G02B 2027/014; G06F 1/1626; G06F 1/1637; G06F 1/1686; G06F 1/1688; G06F 1/169; G06F 1/1698; G06F 3/011; G06F 3/042; G06F 3/044; G06F 2203/04101; G06F 1/1652; G06F 3/016; G06F 3/041; G06F 3/0412; G06F 3/0414; G06F 2203/04102; G09G 3/3208; G09G 2360/144; H01L 27/3227; H01L 27/323; H01L 51/0097; H04R 1/028; H04R 2499/15
See application file for complete search history.

(56) References Cited

U.S. PATENT DOCUMENTS

| | | | |
|---|---|---|---|
| 10,379,616 B2 | 8/2019 | Peshkin et al. | |
| 10,423,228 B2 | 9/2019 | Cherif et al. | |
| 10,679,538 B2 | 6/2020 | Yeo et al. | |
| 2010/0162109 A1* | 6/2010 | Chatterjee | ............... G06F 3/016 715/702 |
| 2016/0124548 A1 | 5/2016 | Cherif et al. | |

(Continued)

FOREIGN PATENT DOCUMENTS

KR       101036618 B1     5/2011

OTHER PUBLICATIONS

Hap2u, URL: hap2u.net, Product: Haptic-enabled screens and mobile devices, downloaded Mar. 12, 2021, 1 page.

*Primary Examiner* — Nelson M Rosario
(74) *Attorney, Agent, or Firm* — Suiter Swantz pc llo

(57) ABSTRACT

A system and method for a haptic display is disclosed. The haptic display includes a display head and an actuator layer. The actuator layer includes a pin board configured with a plurality of opening, and a plurality of pins configured to translate within the plurality of openings. One or more of the plurality of pins includes a display interaction end configured to physically interact with the display head and an actuation end. The actuation layer further includes a plurality of linear actuator elements physically coupled to the actuation end of the plurality of pins configured to bias a set of the pins against the display head. A bias of the set of pins against the display head generates a protrusion on the flexible surface that may be reduced by a biasing force of a user, wherein the user detects a reduction of the protrusion.

20 Claims, 12 Drawing Sheets

(56) References Cited

U.S. PATENT DOCUMENTS

| | | | |
|---|---|---|---|
| 2017/0068318 A1* | 3/2017 | McClure | G06F 3/016 |
| 2018/0004294 A1 | 1/2018 | Eraslan et al. | |
| 2019/0042041 A1* | 2/2019 | Rothkopf | G06F 3/0412 |
| 2019/0138153 A1 | 5/2019 | Olley et al. | |
| 2019/0373096 A1* | 12/2019 | Shim | G06F 1/169 |
| 2020/0184785 A1 | 6/2020 | Khoshkava et al. | |

* cited by examiner

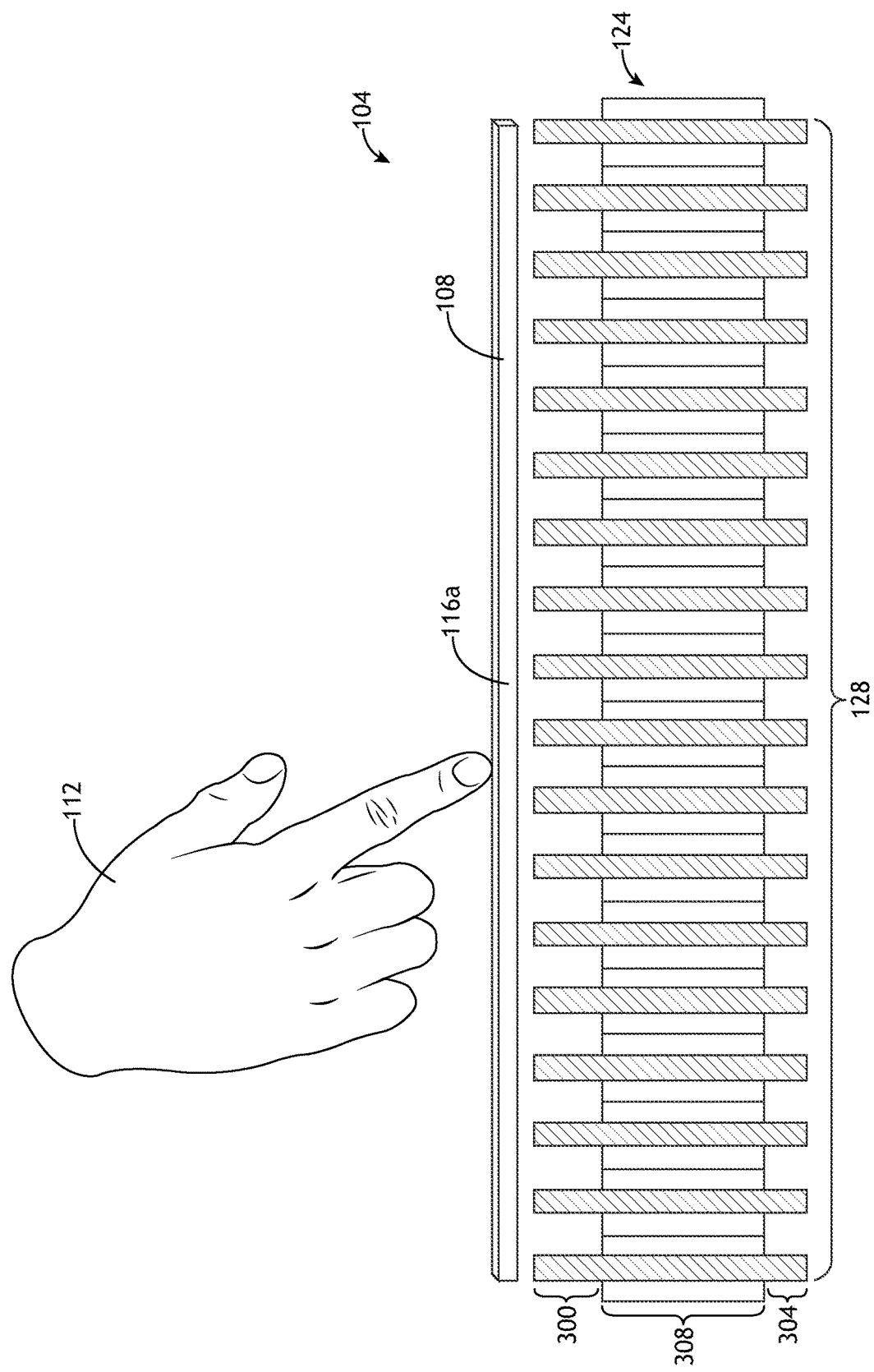

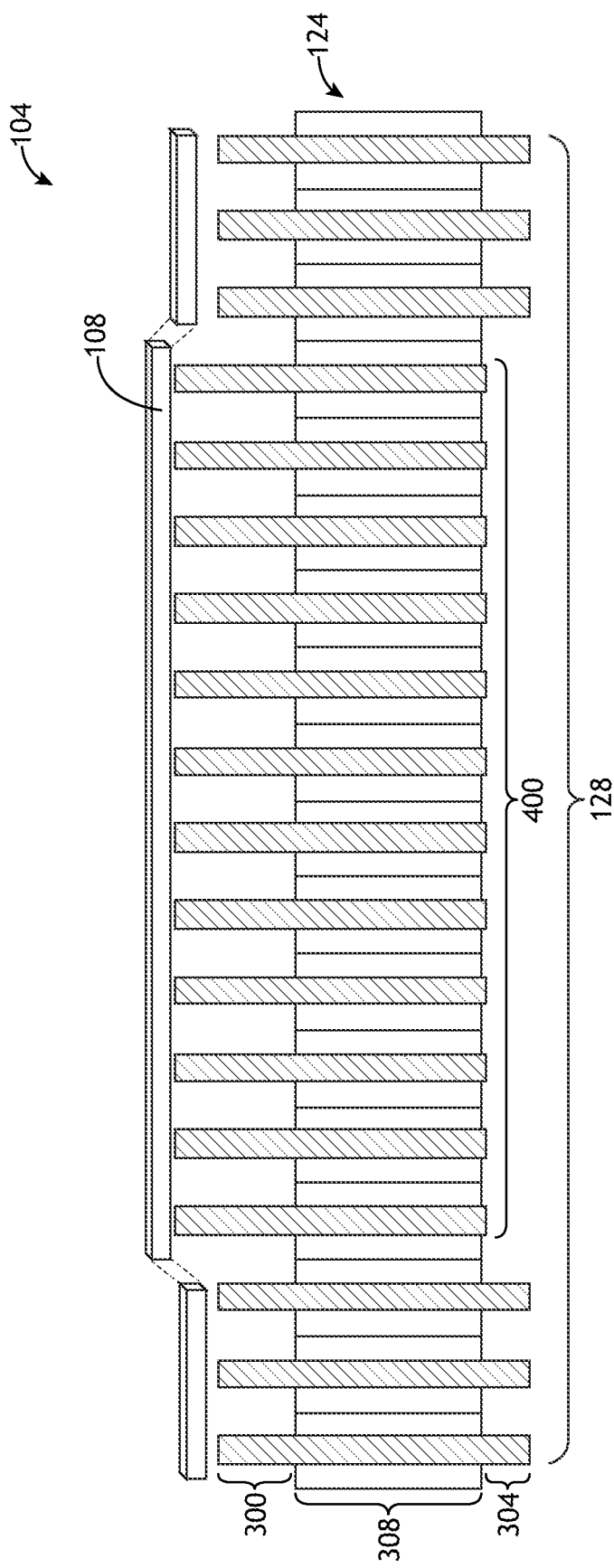

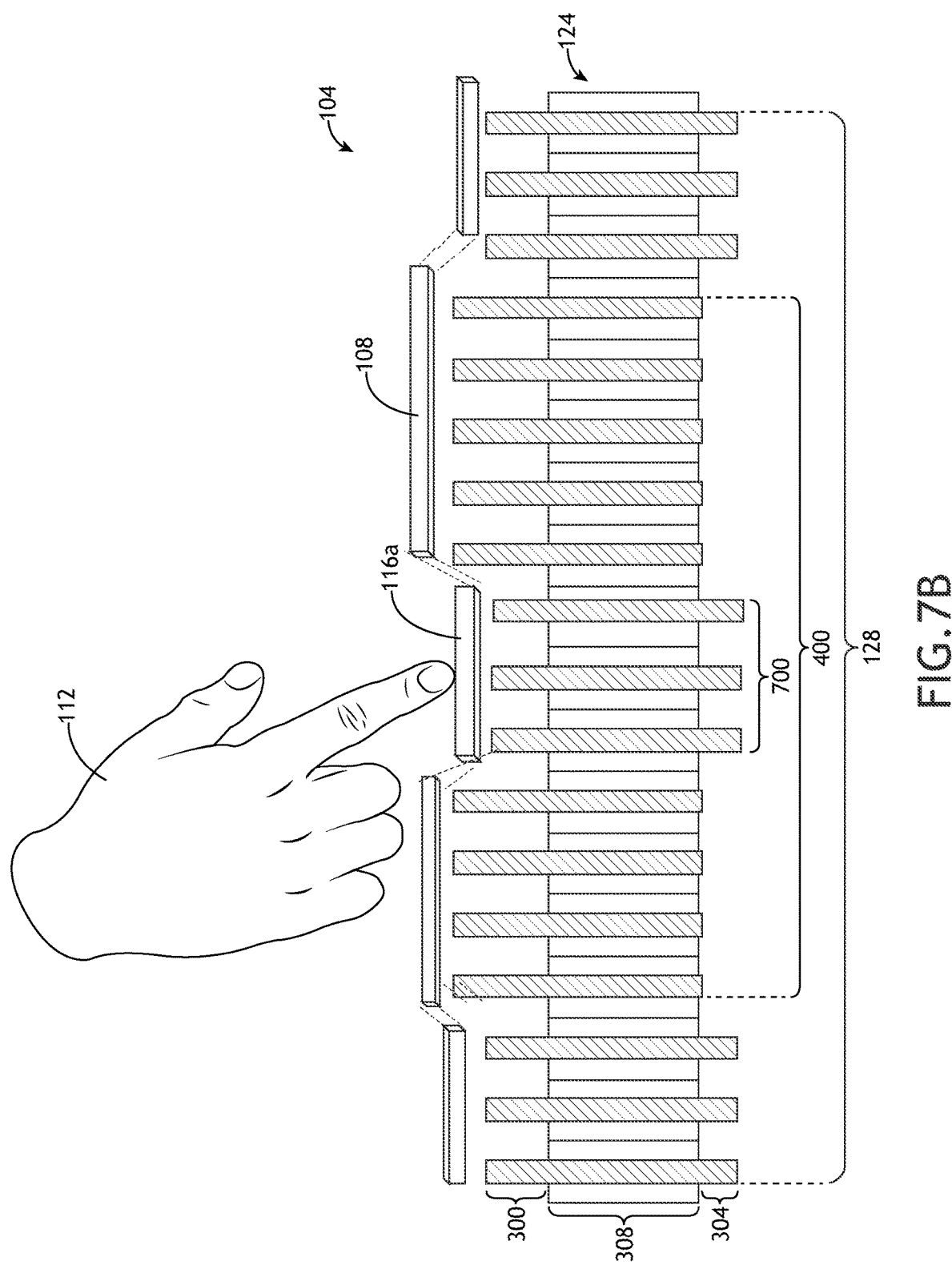

SOFTWARE DEFINED HARD KEYS LEVERAGING FLEXIBLE DISPLAY HARDWARE TO ACHIEVE HAPTIC DISPLAY SOLUTION

BACKGROUND

The emergence of touchscreen technology has expanded the flexibility, form, and function of user interfaces (UI) and human-machine interfaces (HMI). However, limitations in human sensory feedback of touchscreen displays limits user accuracy and user confidence/satisfaction when compared to traditional interface technologies. For example, traditional keyboards typically offer greater accuracy and speed for input of data than a touchscreen keyboard. In another example, a user in a vehicle may more confidently push a physical button rather than a touchscreen icon to illicit a response (e.g., such as pushing a radio button), with the physical feedback of the physical button, in the form of a change in push resistance, button movement, or a clicking mechanism, satisfying the user than the button has been pushed.

One recent improvement in UI has been the development of haptic technologies that engages a user's sense of touch when a UI element on a touchscreen display has been tapped, slid, or otherwise pressed by a user. For example, smartphones may use piezoelectric benders, eccentric rotation mass motors, or linear resonant actuators to produce vibration as feedback to the user that a screen icon has been selected. While these haptic elements provide feedback that a screen icon has been selected, they cannot provide the tactile cues that a physical button provides before the physical button has been pushed. Accordingly, it is desirable to provide a haptic element to a touchscreen display that provides more comprehensive tactile cues to the user than conventional approaches.

SUMMARY

A system is disclosed. In one or more embodiments, the system includes a haptic display. In one or more embodiments, the haptic display includes a display head. In one or more embodiments, the haptic display further includes an actuator layer. In one or more embodiments, the actuator layer includes a pin board configured with a plurality of openings. In one or more embodiments, the actuator layer further includes a plurality of pins configured to translate within the plurality of openings. In one or more embodiments, one or more of the plurality of pins includes a display interaction end configured to physically interact with the display head. In one or more embodiments, one or more of the plurality of pins includes an actuation end. In one or more embodiments, the actuator layer further includes a plurality of linear actuator elements physically coupled to the actuation end of the plurality of pins configured to bias a set of the plurality of pins against the display head. In one or more embodiments, a bias of the set of the plurality of pins against the display head generates a protrusion on the flexible surface. In one or more embodiments, the protrusion may be reduced by a biasing force of a user, wherein the user detects a reduction of the protrusion.

In some embodiments of the system, the system further includes a controller configured to output a driving signal to the plurality of linear actuator elements.

In some embodiments of the system, the display head is configured to display an image that overlaps the protrusion, wherein the image indicates a functional characteristic of the protrusion.

In some embodiments of the system, the system is coupled to a device. In some embodiments of the system, the reduction of the protrusion drives a change in at least one parameter of the device.

In some embodiments of the system, the system further includes an instrument panel. In some embodiments of the system, the haptic display is integrated within the instrument panel.

In some embodiments of the system, the instrument panel is configured within an aircraft.

In some embodiments of the system, the system further includes a speaker. In some embodiments of the system, the speaker is configured to emit a sound upon the reduction of the protrusion.

In some embodiments of the system, upon the reduction of the protrusion, the remaining pins within the set of the plurality of pins are reduced to a default height.

In some embodiments of the system, the protrusion comprises one or more sections.

In some embodiments of the system, the display head is configured to display a display element that overlaps the one of the one or more sections. In some embodiments of the system, the display element indicates a functional characteristic of the one of the one or more sections.

In some embodiments of the system, the system is coupled to a device. In some embodiments, the reduction of the protrusion corresponding to the one of the one or more sections drives a change in at least one parameter of the device.

In some embodiments of the system, a bias of the plurality of pins is adjusted based on at least one of pin position, pin translation velocity, the biasing force of the user, and a functional characteristic of the protrusion.

A method for operating a haptic display is also disclosed. In one or more embodiments, the method includes generating a display element on a display head. In one or more embodiments, the method further includes translating a pin subset of a plurality of pins based on the display element. In one or more embodiments, the method further includes forming a protrusion upon the display head, wherein the protrusion corresponds to the display element. In one or more embodiments, the method further includes contacting the protrusion and display element via a user. In one or more embodiments, the method further includes biasing the protrusion via the user. In one or more embodiments, the method further includes outputting a response based on at least one of the contacting of the display element or the biasing of the protrusion.

In some embodiments of the method for operating a haptic display, the method includes resetting a position of the pin subset.

In some embodiments of the method for operating a haptic display, the method includes modifying the display element based on at least one of the display element shape, or position of the display element on the display head. In some embodiments of the method for operating a haptic display, the method includes modifying the protrusion based on a modification of the display element.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5 is a close-up side view of a display head, a pin board, and a plurality of pins, wherein a button is pressed upon by a user, in accordance with one or more embodiments of the disclosure;

FIG. 7A-B are close up side views of a display head, a pin board, and a plurality of pins, wherein one or more buttons forms a pocket when pushed, in accordance with one or more embodiments of the disclosure;

DETAILED DESCRIPTION

Figure 1:
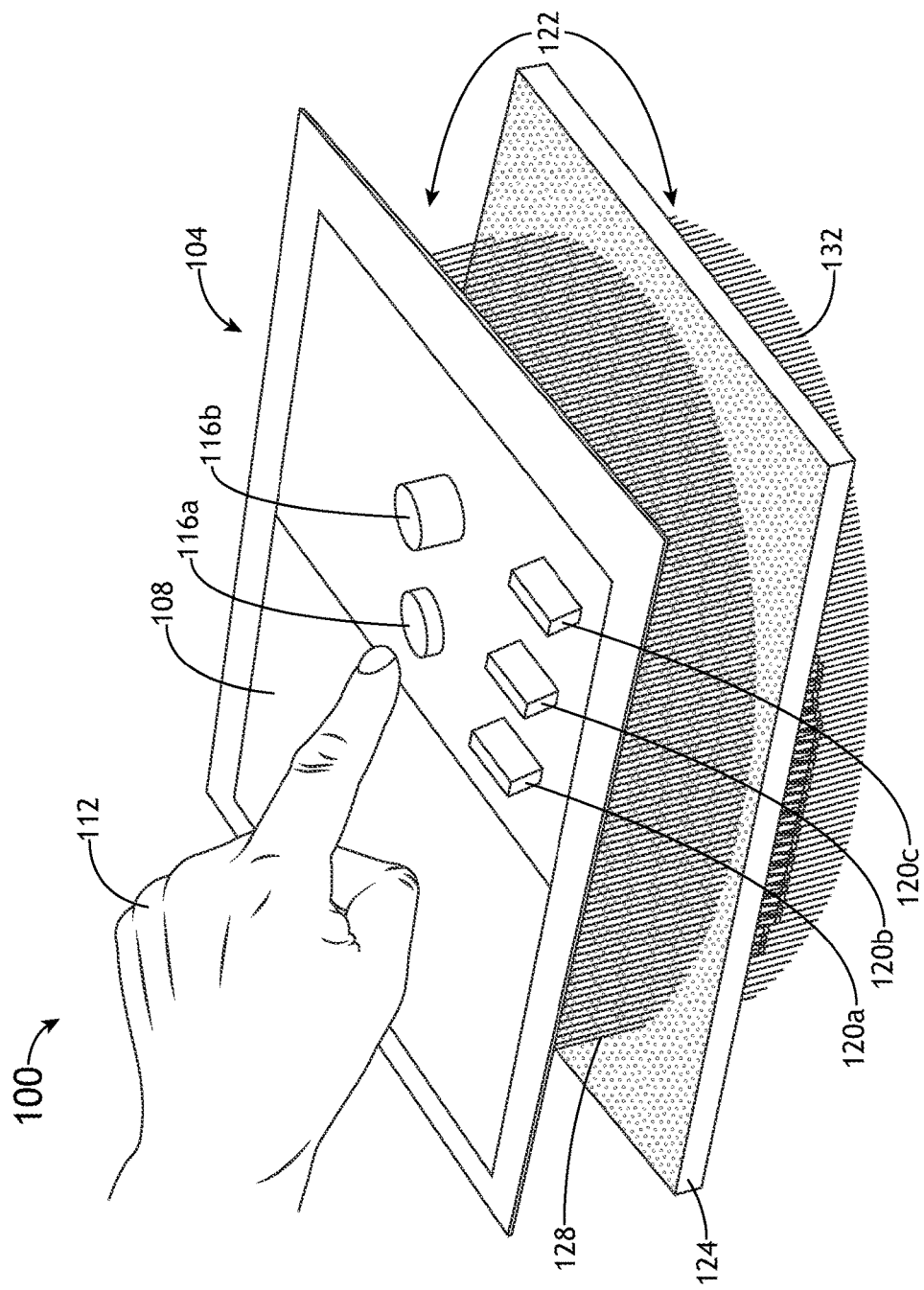
FIG. 1 is a drawing illustrating a system including a haptic display 104, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A display system with haptic control is disclosed. The display system includes a touchscreen display that is flexible and an actuating layer comprised of a series of translatable pins configured to press up against the flexible display, forming a physical button or hard key than can be pushed by a user, simulating a traditional physical button on an instrument panel. The display system is reconfigurable for different layouts or button depending on the needs of the user.

FIG. 1 is a drawing illustrating a system 100 including a haptic display 104, in accordance with one or more embodiments of the disclosure. The haptic display 104 may be used in any environment. For example, the haptic display 104 may be configured as a portion of an instrument panel or integrated into the instrument panel. For instance, the haptic display 104 may be configured as a portion of an instrument panel in a vehicle such as an aircraft, ship, or automobile. In another instance, the system 100 may include the instrument panel, the vehicle, and/or other device.

In some embodiments, the haptic display 104 includes a display head 108 configure to output an image to a user 112. The display head 108 may be any type of display technology including but not limited to a liquid crystal display (LCD), a light emitting diode (LED) display, a plasma display panel (PDP), and electroluminescent panel, an organic light-emitting diode (OLED) display, a quantum dot light-emitting diode (QLED) display, an active-matrix liquid crystal display (AMLCD), a digital light processing (DLP) display, a liquid crystal on silicon (LCOS) display, an electronic paper display (e.g., E ink display, or Gyricon display), and active-matrix organix light-emitting diode (AMOLED) display, an active-matrix electroluminescent display (ELD), an interfrometric modulator display (IMOD), a field emission display (FED), or a surface-conduction electron-emitter display (SED). In some embodiments, the display head 108 is touch sensitive, allowing the user to select icons, menu items, and other image elements on the display head 108.

In some embodiments, the display head 108 is configured to be flexible. For example, the display head 108 may be configured to form one or more buttons 116a-b (e.g., hard keys), one or more keys 120a-c or other physical element (e.g., protrusions) commonly known to appear on an instrument panel. For instance, the display head 108 may be configured as a flexible/malleable LCD display that allows a force from the underside (e.g., nonviewing side) of the display head 108 to raise a portion of the display head 108 relative to the viewing plane of the display head. One formed, the button 116a-b, key 120 a-c, or other physical element may be acted upon by the user. For example, the user 112 may push shown on the button 116a, which would result in a decreased height of the button 116a (e.g., decrease the height of the protrusion) and signal to circuitry within the haptic display 104 that the button 116a has been pushed. Any type of physical element may be formed by the display head 108 in addition to buttons 116 a-b and keys 120 a-c including but not limited to switches (e.g., toggle, rotary) dials, knob, levers, and slides. It should be understood that the term button 116a-b may refer to any physical element formed by the display head 108.

In some embodiments, the pressing of the button 116a-b, key 120 a-c, or other physical element (e.g., causing a reduction of the protrusion) results in a corresponding change in the device by which the system 100 is coupled. For example, if the button 116a is designated as power button to a radio communicatively coupled to the system 100, pressing the button 116a may then result in a powering on of the radio. In another example, if the system 100 is communicatively coupled to an external display and the key 120a is designated to input the letter "A" when pressed, then pressing the key 120a may result in the letter "A" appearing on the external display.

In some embodiments, the haptic display 104 includes an actuation layer 122 configured to provide protrusion-forming force upon the display head 108. In some embodiments, the actuation layer includes a pin board 124 composed of a plurality of openings, and a plurality of pins 128 that are threaded into the plurality of openings. The plurality of pins 128 are configured to translate within the plurality of openings. For example, the button 116b may be formed by a set of the plurality of pins 128 pressing against the underside of the display head 108. The pin board 124 may be configured of any size, shape, number of openings, or pattern of openings. Likewise, the plurality of pins may be configured of any size (e.g., thickness or length) or number. The plurality of openings may be configured as any shape or size. The haptic display 104 may further include a backplane configured to provide a physical substrate for attaching display circuitry, actuators, and other components.

In some embodiments, the actuation layer 122 further includes a plurality of linear actuator elements 132 configured to translate the plurality of pins 128. The plurality of linear actuator elements may be separate from, or integrated into the pin board 124. The plurality of linear actuator elements 132 may include any technology capable of translating the plurality of pins 128 relative to the pin board 124. For example, the plurality of linear actuator elements 132 may be configured as a plurality of electro-mechanical actuators. For instance, the electro-mechanical actuator may be configured as a screw, wheel and axle, or cam actuator powered by a small motor. In another example, the plurality of linear actuator elements 132 may be configured as a plurality of piezoelectric actuator. In another example, the plurality of linear actuator elements 132 may be configured as a plurality of microelectromechanical system (MEMS) actuators. For instance, the MEMS actuator may be configured as a MEMS magnetic actuator.

Figure 2:
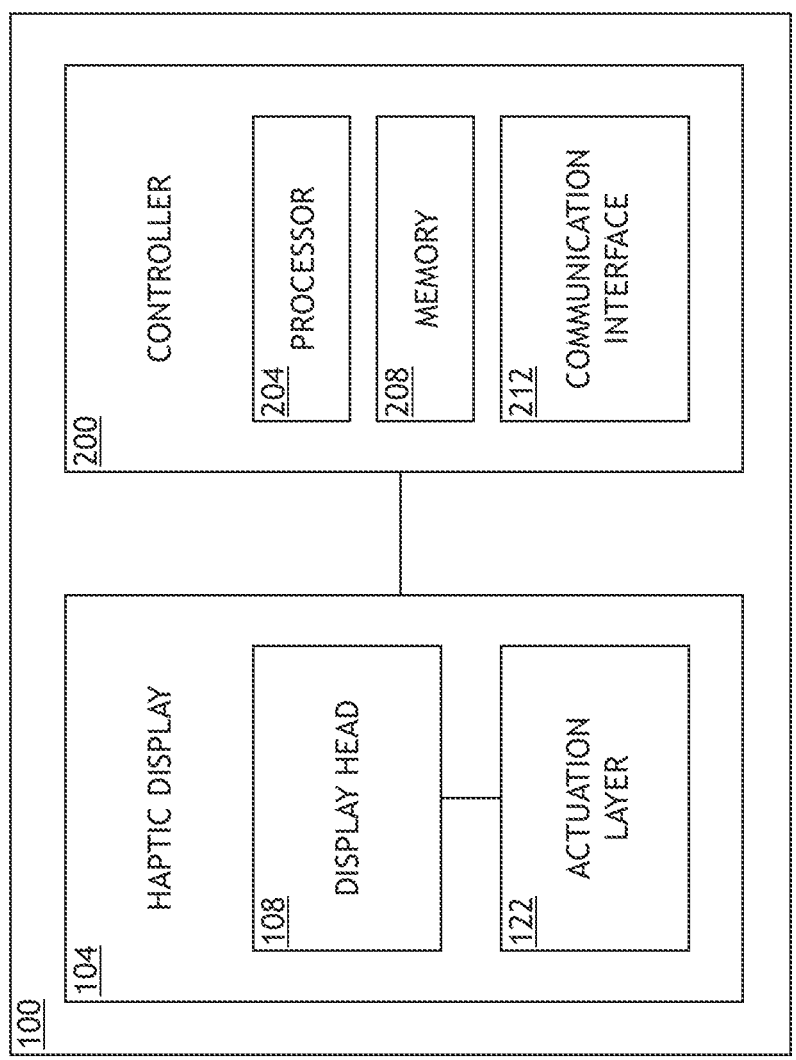
FIG. 2 is a block diagram illustrating a system, in accordance with one or more embodiments of the disclosure.

FIG. 2 is a block diagram illustrating the system 100, in accordance with one or more embodiments of the disclosure. In some embodiments, the haptic display includes a controller 200 that includes one or more processors 204, a memory 208, and a communication interface 212. The controller 200 is configured to provide processing functionality for at least the haptic display (e.g., the controller may provide a driving signal to the plurality of linear actuator elements) and can include the one or more processors 204 (e.g., micro-controllers, circuitry, field programmable gate array (FPGA), central processing units (CPU), application-specific integrated circuit (ASIC), or other processing systems), and resident or external memory 208 for storing data, executable code, and other information. The controller 200 can execute one or more software programs embodied in a non-transitory computer readable medium (e.g., memory 208) that implement techniques described herein. The controller 200 is not limited by the materials from which it is formed or the processing mechanisms employed therein and, as such, can be implemented via semiconductor(s) and/or transistors (e.g., using electronic integrated circuit (IC) components), and so forth.

The memory 208 can be an example of tangible, computer-readable storage medium that provides storage functionality to store various data and/or program code associated with operation of the controller 200, such as software programs and/or code segments, or other data to instruct the controller 200, and possibly other components of the control module 608, to perform the functionality described herein. Thus, the memory 208 can store data, such as a program of instructions for operating the haptic display 104, including its components (e.g., controller 200, communication interface 212, etc.), and so forth. The memory 208 may also store data derived from the haptic display 104. It should be noted that while a single memory 208 is described, a wide variety of types and combinations of memory 208 (e.g., tangible, non-transitory memory) can be employed. The memory 208 may be integral with the controller 200, may comprise stand-alone memory, or may be a combination of both. Some examples of the memory 208 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 212 may be operatively configured to communicate with components of the haptic display 104 and the system 100. For example, the communication interface 212 can be configured to retrieve data from the controller 200 or other components, transmit data for storage in the memory 208, retrieve data from storage in the memory 208, and so forth. The communication interface 212 can also be communicatively coupled with the controller 200 to facilitate data transfer between components of the haptic display 104 and the controller 200. It should be noted that while the communication interface 212 is described as a component of the haptic display 104, one or more components of the communication interface 212 can be implemented as external components communicatively coupled to the haptic display 104 via a wired and/or wireless connection. The haptic display 104 can also include and/or connect to one or more input/output (I/O) devices. In embodiments, the communication interface 212 includes or is coupled to a transmitter, receiver, transceiver, physical connection interface, or any combination thereof.

In some embodiments, the display head 108 and the actuation layer 122 tandemly coordinated via the controller 200. For example, a button 116a that is physically formed by the actuation layer 122 may also have a button icon displayed on the display head 108 that overlaps the position of the button 116a. In another example, a pressing of the button 116a by the user 112 may activate, or otherwise signal a response, to both the display head 108 and the actuation layer 122. In another example, a change in the programming of the display head (e.g., to display a different set of button icons having different functions) would also result in a corresponding change of the actuation layer 122 to form buttons 116 a-b, or other haptic elements based on the current display of the display head.

Figure 3:
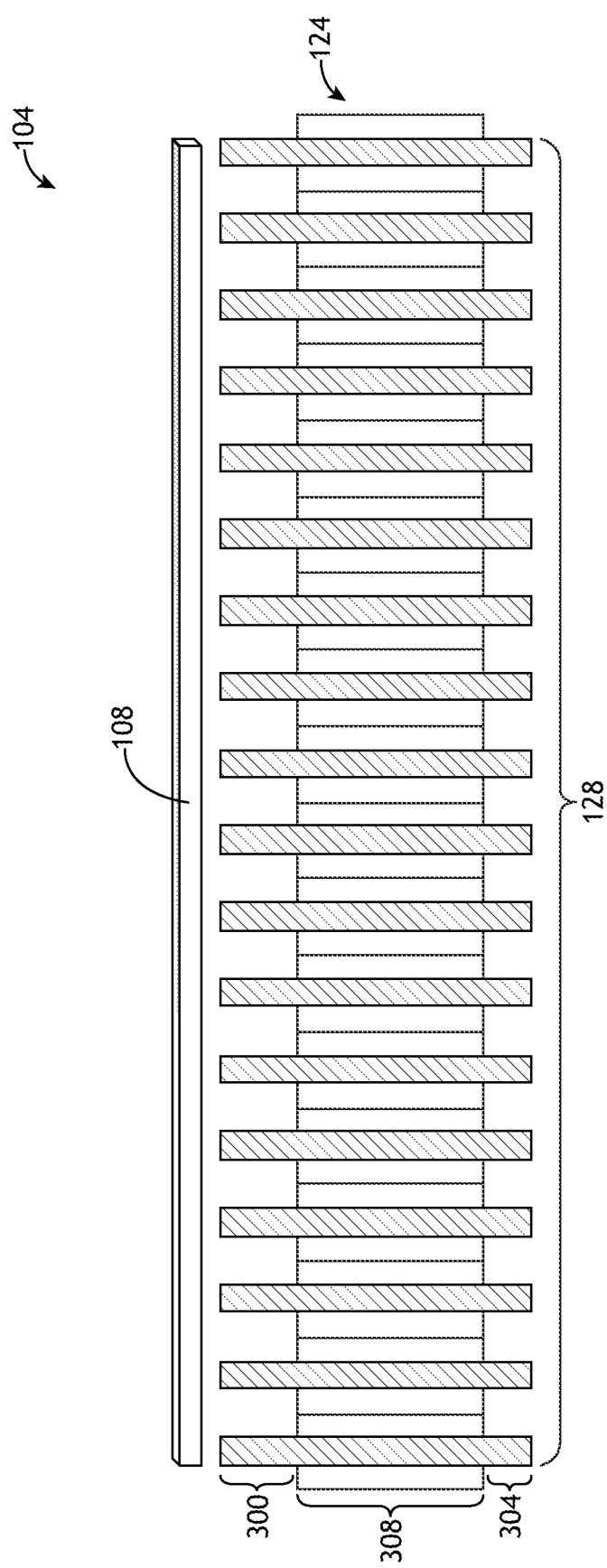
FIG. 3 is a close-up side view of a display head, a pin board and a plurality of pins, under non-haptic activation conditions, in accordance with one or more embodiments of the disclosure.

FIG. 3 is a close-up side view of the display head 108, pin board 124 and the plurality of pins 128, under non-haptic activation conditions (e.g., no formation of a button 116 a-b or other physical element), in accordance with one or more embodiments of the disclosure. The plurality of pins 128 are inserted within the plurality of openings of the pin board 124. In interest of clarity, the pin board is drawn as semi-transparent, with the plurality of pins showing through the pin board 124. The display head 108 is disposed upon or immediately adjacent to the plurality pins 128. For example, the display head may be disposed upon or immediately adjacent to a display interaction end 300 of one or more of the plurality of pins 128. The one or more of the plurality or pins 128 may also include an actuation end 304 configured to interact with the one or more linear actuator elements 132 (not shown for clarity). The actuation end 304 may be separate from, or include, a pin board portion of one or more of the plurality of pins 128 that is inserted within the pin board 124. It should be understood that the any size of the one or more of the plurality of pins, or the relative size of the one or more of the plurality of pins 128 as compared to the pin board 124 and/or display head 108 is possible, and that the illustrations herein are intended to merely the presence and/or interaction of components of the haptic display 104. Therefore, the description herein should not be interpreted as a limitation of the present disclosure, but merely an illustration.

Figure 4:
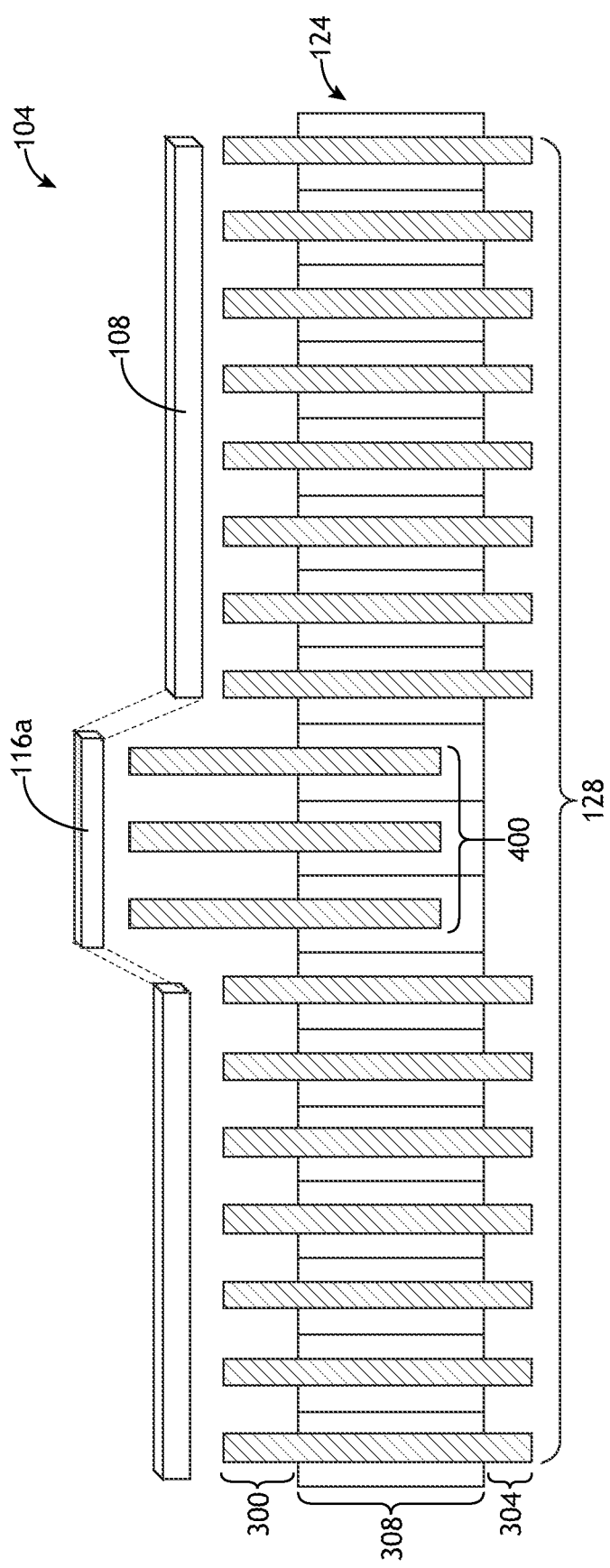
FIG. 4 is a close-up side view of a display head, a pin board and a plurality of pins 128, under haptic activation conditions, in accordance with one or more embodiments of the disclosure.

FIG. 4 is a close-up side view of the display head 108, pin board 124 and the plurality of pins 128, under haptic activation conditions (e.g., formation of a button 116 a-b or other physical element), in accordance with one or more embodiments of the disclosure. Upon activation of a subset of linear actuator elements 132, a pin subset 400 of the plurality of pins 128 translates relative to the pin board 124 (e.g., via a biasing force provided by the linear actuator elements 132), resulting in a stretching, flexing, bending, or other manipulation of a portion of the display head to form the button 116a. It should be understood that any overlapping of the one or more of the plurality of pins 128 and the pin board 124 are possible. For example, the actuation end 304 of one or more of the plurality of pins 128 may recess within the pin board 124 upon activation of the one or more linear actuator elements 132. In another example, the plurality of pins 128 may have a length that does not permit one or more of the plurality of pins 128 to recess within the pin board 124 upon activation of the one or more linear actuator elements 132. Similarly, the display interaction end 300 of the one or more of the plurality of pins may recess or not recess within the pin board. Therefore, the above description should not be interpreted as a limitation of the present disclosure, but merely an illustration.

FIG. 5 is a close-up side view of the display head 108, the pin board 124, and the plurality of pins 128, wherein the button 116 is pressed upon by the user 112, in accordance with one or more embodiments of the disclosure. Upon the pressing of the button 116a by the user 112 (e.g., the finger of the user providing a biasing force against the button 116a), the pin subset pin subset 400 of the plurality of pins 128 translates relative to the pin board 124, and the portion of the display head 108 that was originally raised to form the button 116a is now partially or wholly reduced in height (e.g., to the nominal or default position). The haptic display 104 may be configured for any adjustment of the pin subset 400 and/or the portion of the display head forming the button 116a after the pressing of the button 116a. For example, the pressing of the button 116a may cause the pin subset 400 to retract fully so that the display interaction end 300 is nearly flush with the surface of the pin board 124. In another example, the pressing of the button 116a may cause the pin subset to retract to a default position along with the rest of the plurality of pins 128, as shown in FIG. 3.

In embodiments, the haptic display 104 is configured to generate a tactile sensation for the user 112. For example, the tactile sensation may be generated by the user initially touching a haptic-generated structure (e.g., the button 116a). For instance, the tactile sensation may be generated by the user touching the raised surface of the button 116a. In particular, the raised surface may allow a user 112 to easily find the button 116a by touch while the user 112 is performing another task (e.g., piloting an aircraft), and provides feedback to the user 112 that the button 116a has been identified. In another example, the tactile sensation may be generated by the user 112 causing a movement within the haptic-generated structure. For instance, the tactile sensation may be generated by the user 112 pushing the button 116a and detecting both the sense of movement of the button 116a as it is being pushed down, and the resistance from the button 116a as it is being pushed down. The combination of the resistance of the button 116a and the sense of movement of the finger of the user 112 during the pressing of the button 116a provides feedback to the user 112 that the user 112 is indeed pressing the button 116a.

In another example, the tactile sensation may be generated by the linear actuator elements 132 or other components within the actuation layer 122 based on a user input that reaches a specific threshold. For instance, the, once the user has pushed the button 116a with a predetermined force or displacement, the linear actuator elements 132 may alter the resistance to the button 116a such that the user detects a tactile sensation similar to a clicking sensation of a click button, providing feedback to the user that the button 116a has been successfully pushed. In another example, the haptic display 104 may provide a vibration or other sensation upon successful pressing of a button 116a or other haptic structure. For instance, the vibration may be generated any vibration method known and previously listed above. In particular, the vibration may be generated via a rapid back and forth cycling of one or more of the plurality of linear actuator elements 132 over a short distance. The haptic display 104 may be programmed to control the placement, speed, resistance, and any other characteristic of any one of the plurality of pins 128 in order to generate the tactile sensation for the user 112.

In embodiments, the biasing force of the plurality of pins 128 (e.g., the force applied to one or more of the plurality of pins 128) is may be adjusted based on one or more pin parameters. The one or more pin parameters may be any characteristic of the pin or system including but not limited to pin position, pin translation velocity, the biasing force of the user, or the function characteristic of the button 116*a*. For example, for a button 116*a* in the process of being pressed, the biasing force of one or more of the plurality of pins 128 may lessen, providing feedback to the user 112 that the button 116*a* has been pushed. In another example, for a button 116*a* that is rapidly and forcefully pushed (e.g., high pin translation velocity or high biasing force by the user), the bias of one or more of the plurality of pins 128 may increase, preventing damage to the display head 108 and/or the pin board 124. In another example, the haptic display 104 may be configured with two buttons 116*a-b* having differing basing forces. For instance, the haptic display 104 may include a button 116*a* having low biasing force that powers on a radio of an aircraft, and include a button 116*b* having high biasing force that shuts off the aircraft engine.

In some embodiments, the system 100 further includes a speaker communicatively coupled to the haptic display 104. For example, when the user 112 has pushed the button 116*a*, the speaker may emit and audible click sound. In another example, the 116*a* had pushed the button 116*a*, the speaker may emit a voice message stating relating to the assigned function of the button 116*a*. The speaker may be configured as any type of speaker. For example, the speaker may be speaker built into the haptic display 104. In another example, the speaker may be a cockpit speaker, such as a speaker utilized by aircraft warning systems.

Figure 6A:
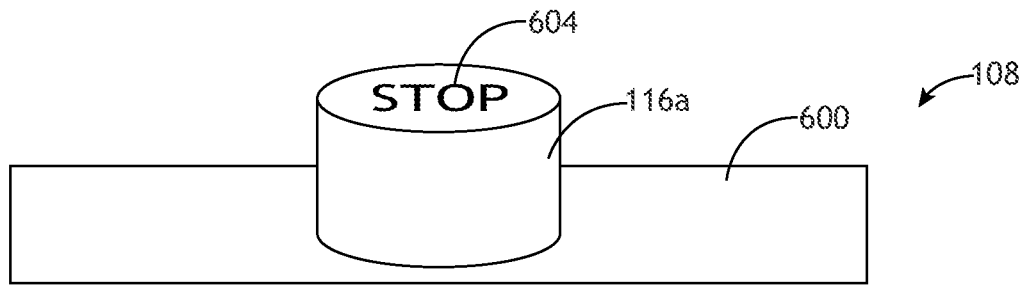
FIG. 6A-C illustrate a button formed on a top surface of a display head, in accordance with one or more embodiments of the disclosure.
Figure 6B:
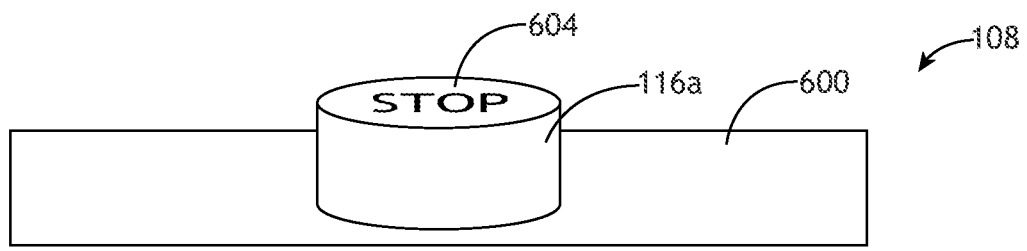
Figure 6C:
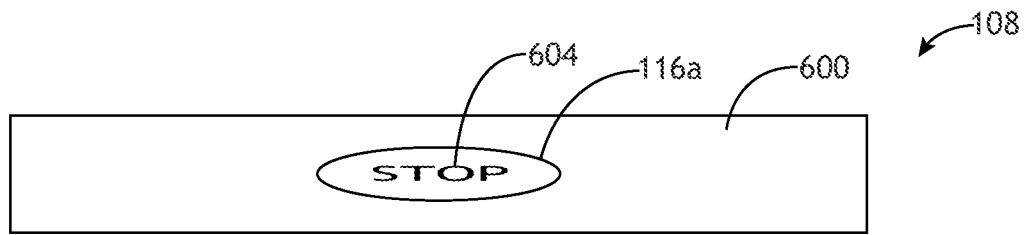

FIG. 6A-C illustrate a button 116*a* formed on a top surface 600 of the display head 108, in accordance with one or more embodiments of the disclosure. The portion of the top surface 600 that covers the top of the button 116*a* may display a display element 604 that is relevant to the function of the button 116*a* (e.g., the "stop" icon in FIG. 6A-C). Before pressing by a user 112, the button 116*a* may be stationed at a default/unpressed height (e.g., FIG. 6A). Upon the pressing of the button 116*a* by the user 112, the button decreases in height (e.g., FIG. 6B) until the height of the button is at or near the planar surface of the top surface 600. During the interaction of the user 112 with the button 116*a*, the display element 604 may change accordingly. Any change in the display element is possible. For example, pressing of the button 116*a* may result in a lessening of the contrast of the display element 604 (e.g., the greying-out of the "stop icon" in FIG. 6B).

In some embodiments, upon a pressing of the button 116*a* (e.g., reduction of the height of the protrusion by the user 112), the remaining pins within the pin subset 400 are reduced to a default height. For example, when button 116*a* is successfully pushed by a user, the plurality of pins 128 that correspond to the area of the button 116*a* that was not physically touched by the user 112 will also be reduced in height similar to the pushed area. In this way, the button 116*a* retains its general physical shape regardless of the position or size of the finger pressing the button 116*a*. The system 100 may also be configured so that the linear actuator elements 132 and corresponding pins 128 are configured with a pressure sense and/or position sense, so that when a threshold is crossed on an individual pin 128 or a subset or pins 128, that all of the pins 128 correlated with the button 116*a,b* will become momentarily unenergized and/or return the default position, confirming to the user 112 that the button 116*a,b* has been pressed.

In some embodiments, the haptic display 104 is configured as a relatively flat surface wherein one or more buttons 116*a-b* forms a pocket when pushed, as shown in FIG. 7A-B. For example, the actuation layer 122 may be configured so that all, or a majority of, the plurality of pins 128 are raised, creating a large raised pin subset 400. Correspondingly, the pin subset 400 raises all or a portion of the display head (e.g., as shown in FIG. 7A). Upon an input by the user 118 a section 700 of the pin subset 400 is pushed downward (e.g., as shown in FIG. 7B). For example, the section 700 may be configured with one or more of the plurality of pins 128 having a lower resistance to movement that the rest of the pin subset 400.

Figure 8A:
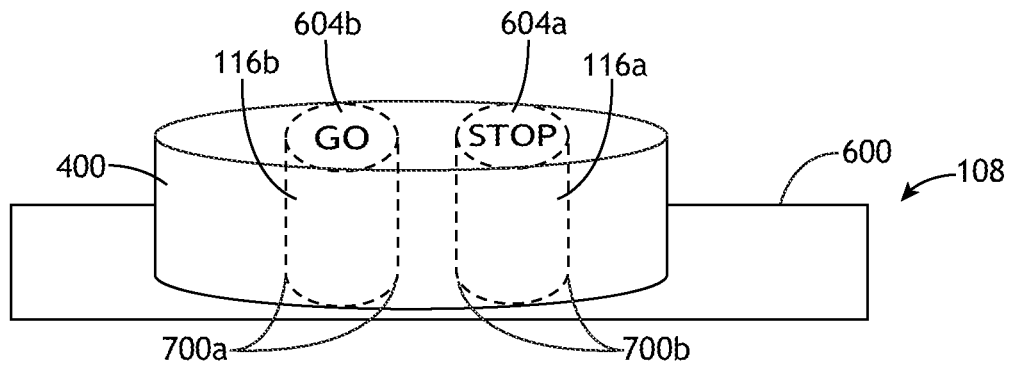
FIG. 8A-C illustrates two buttons formed within the pin subset of the display head, in accordance with one or more embodiments of the disclosure.
Figure 8B:
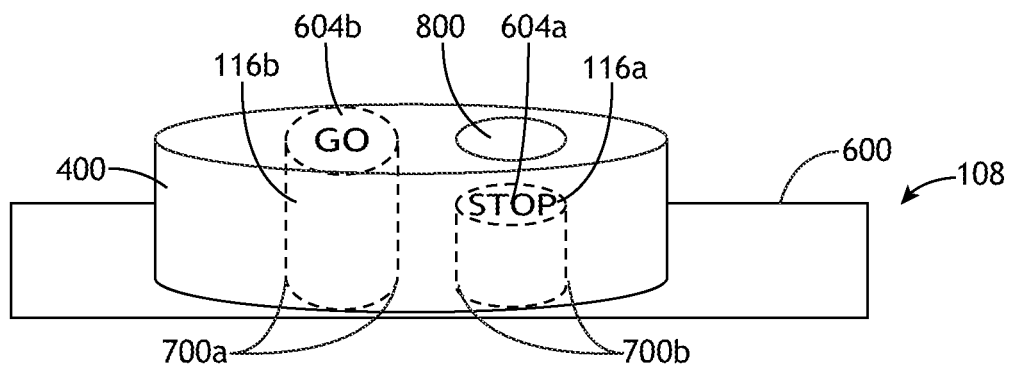
Figure 8C:
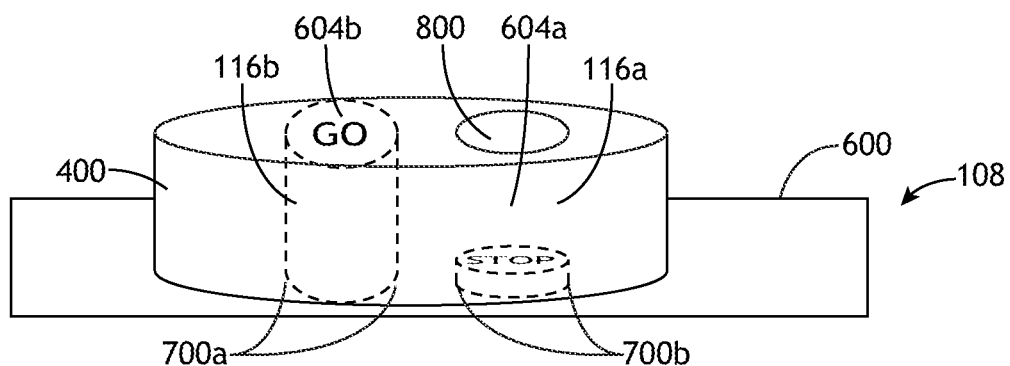

FIG. 8A-C illustrates buttons 116*a-b* formed within the pin subset 400 of the display head 108, in accordance with one or more embodiments of the disclosure. The buttons 116*a-b* may correspond to section 700*a*, 700*b* of the pin subset 400 and when in a default position, may have a top surface approximately the same plane as the pin subset, as shown in FIG. 8A. The buttons 116*a,b* may display functionally relevant display elements 604*a*, 600*b* (e.g., "stop" and "go"). Upon a touch or pressure upon the button 116*a* from a user 112, the button 116*a* may reduce in elevation, forming a recess 800, as shown in FIG. 6B. In some instances, the button 116*a* may be further pressed until the surface of the button is at or near the unraised surface of the display head 108. After the button 116*a* has been pushed, the button 116*a* may stay depressed until an input from the user 112 (e.g., pressing the "go" button 116*b*), or from the system 100 is received.

Figure 9:
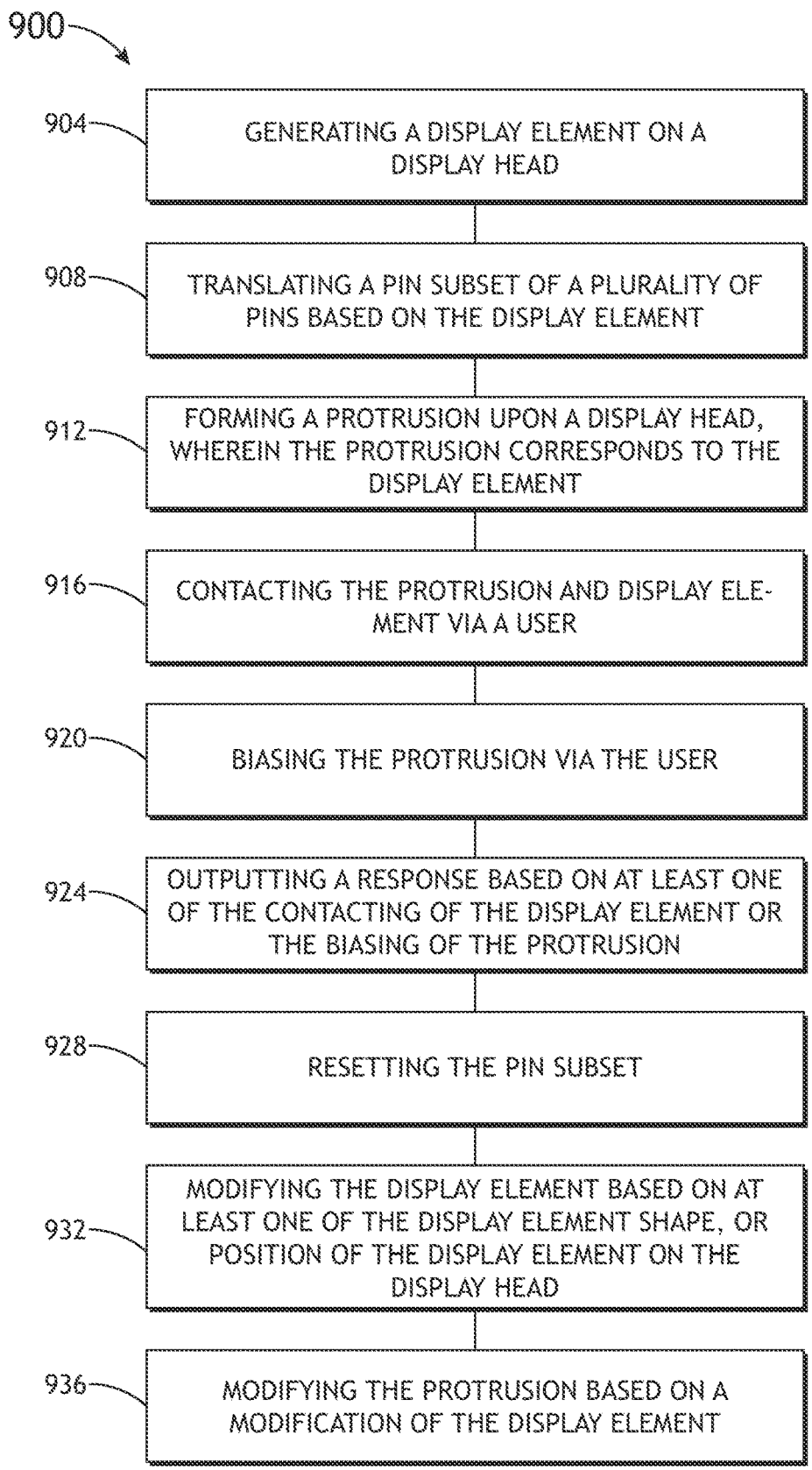
FIG. 9 is a method for operating the haptic display, in accordance with one or more embodiments of the disclosure.

FIG. 9 is a method 900 for operating the haptic display 104, in accordance with one or more embodiments of the disclosure. In some embodiments, the method 900 includes a step 904 of generating a display element 604 on a display head 108. For example, the controller 200 via the one or more processors 204 executing software stored on a memory 208, may output a display element 604 (e.g., such as a "stop" button) to the display head.

In some embodiments, the method 900 includes a step 908 of translating a pin subset 400 of the plurality of pins 128 base on the display element 604. For example, if the display element 604 is configured as a hexagonal stop sign on the top left corner of the top surface 600 of the display head 108, then a pin subset 400 corresponding to the shape, size, and placement of the display element 604 will be translated towards, or differentially biased against, the area of the top surface 600 occupied by the display element 604.

In some embodiments, the method 900 further includes a step 912 of forming a protrusion (e.g., button 116*a-b*, key 120*a-c*, or other haptic element), corresponding to the display element 604. For example, the biasing force of the translation of the pin subset 400 against the flexible display head 108 may result in the formation of the button 116*a*.

In some embodiments, the method 900 further includes a step 916 of contacting the protrusion (e.g., button 116*a*) and display element 604 via the user 112. For example, as when the user attempts to push the button 116*a*, the user will simultaneously touch both the display element 604 (e.g., as it appears on the top surface 600) and the raised button 116*a*.

In some embodiments, the method 900 further includes a step 920 of biasing the protrusion (e.g., the buttons 116*a-b*, keys 120 a-c or other haptic elements) via the user 112. For example, the user 112 may press upon the button 116*a* via the user's finger, resulting in the button 116*a* changing in elevation relative to the plane of the top surface 600, as well as changes in the translation position of the pin subset 400 relative to other pins of the plurality of pins 128.

In some embodiments, the method 900 further includes a step 924 of outputting a response based on at least one of the contacting the display element of the biasing of the protrusion (e.g., the buttons 116*a-b*, keys 120 a-c or other haptic elements). For example, if the button 116*a* is defined, via the controller, as a "stop" button for a radio, then the haptic display 104 may output a response or signal to the radio to shut off once the button 116*a* is pushed.

In some embodiments, the method 900 further includes a step 928 of resetting the pin subset 400. For example, if the button 116*a* is defined as a radio "stop" button that has been pushed, the system 100 may later receive a signal to reset the pin subset via the activation layer. For example, the system 100 may receive an input that the radio, once powered off via the "stop button" 116*a*, has now been powered up, necessitating the need for the reformation of the button 116*a*.

In some embodiments, the method 900 further includes a step 932 of modifying the display element 604 based on at least one of the display element shape, or position of the display element 604 on the display head 108. For example, if there is a need for the display head 108 to include a greater number of display elements 604, the haptic display may be reset, via the controller, to both include the increased number of display elements 604 and/or to reduce the size of a specific display element 604. In another example, the shape of a display element 604 may be altered due to user preference.

In some embodiments, the method 900 further includes a step 936 of modifying the protrusion (e.g., the buttons 116*a-b*, keys 120 a-c or other haptic elements) based on a modification of the display element. For example, a modification to the display element 604 based on user preference may result in a corresponding change in the button via the plurality of pins 128 as controlled by the plurality of linear actuator elements 132 via the controller 200.

Figure 10A:
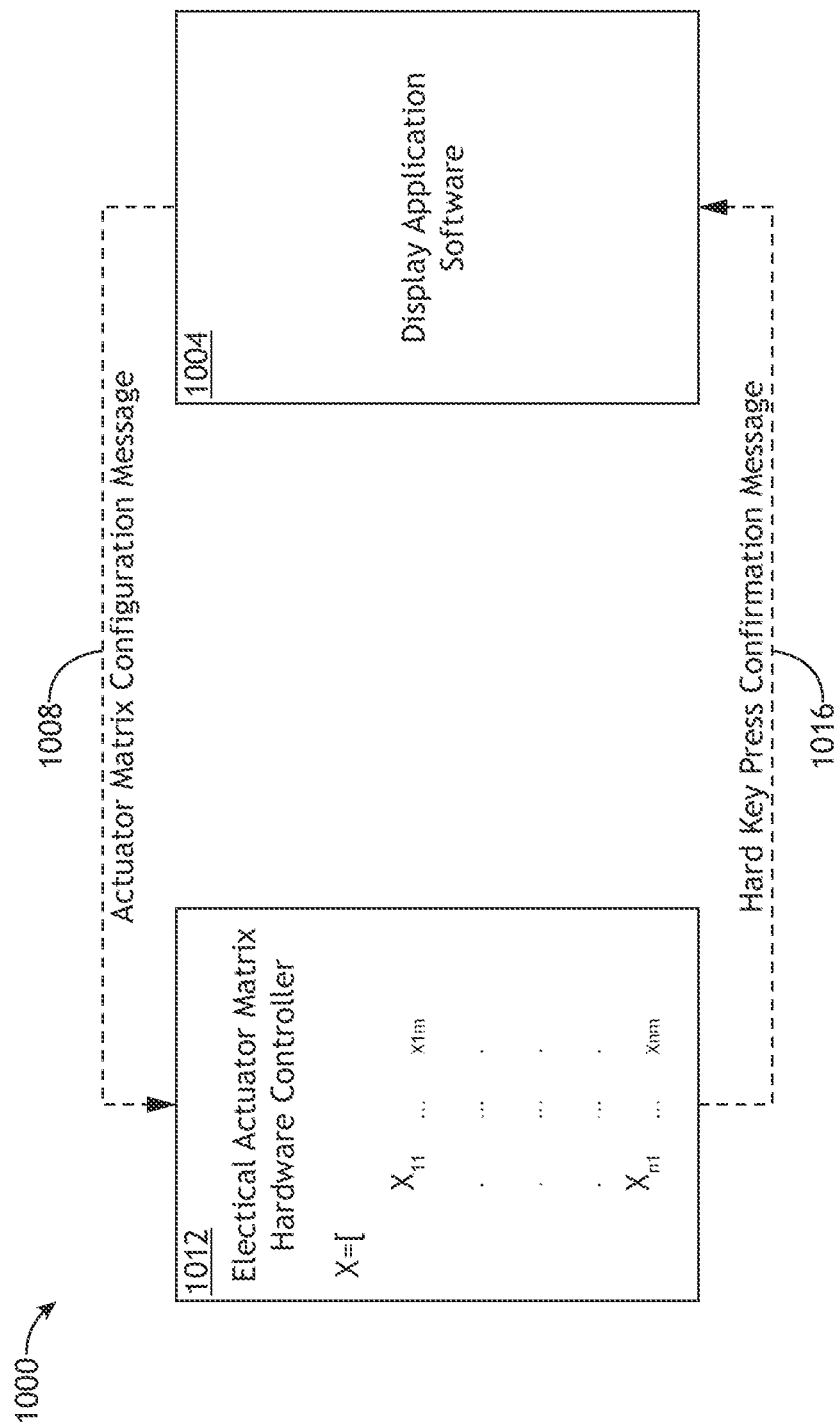
FIG. 10A is a block diagram of a display/hardware communication scheme 1000 for use in operating the system 100, in accordance with one or more embodiments of the disclosure.

FIG. 10A is a block diagram of a display/hardware communication scheme 1000 for use in operating the system 100, in accordance with one or more embodiments of the disclosure. In some embodiments, the display/hardware communication scheme 1000 includes display application software 1004 configured to define buttons 116*a,b* (e.g., hard keys) by correlating individual linear actuator elements 132 within the actuation layer 122 with unique software defined keys via the actuator matrix configuration message 1008. For example, the actuator matrix configuration message 1008 may include data (e.g., definitions, repeat counts, or ranges) that define the configuration of a specific group of linear actuator elements. Using a collection or pattern of correlated actuators, any general form and/or geometric button 116*a,b* shape is achievable including but not limited to a square, circle, line segment, or icon outline. The data application software 1004 may supplement defined button 116*a,b* forms with graphical display aspects aligning with button 116*a,b* shape, such as border or label, onto the display head 108.

In some embodiments, the display/hardware communication scheme 1000 further includes an electrical actuator matrix hardware controller 1012 configured to receive and process the actuator matrix configuration message 1008. For example, in response for receiving the actuator matrix configuration message 1008, the electrical actuator hardware controller will actuate one or more of the plurality of linear actuator elements 132 to form buttons 116*a,b* as defined in the actuator matrix configuration message 1008. The electrical actuator matrix hardware controller 1012 may be configured to sense pressure placed upon one or more pins 128. When the pressure against one or more pins exceeds a defined threshold, all similarly correlated actuators may be de-energized and/or return to the default position, which may signal a successful button 116*a,b* press. Upon the successful pressing of the button 116*a,b*, the electrical actuator matrix hardware controller asynchronously sends a hard key press confirmation message 1016 that relays the identity of the pressed button 116*a,b* to the display application software 1004. The key layout and/or configuration may be dynamically controlled by the display application software during operation to form indefinite pages, menus, and configurations.

Figure 10B:
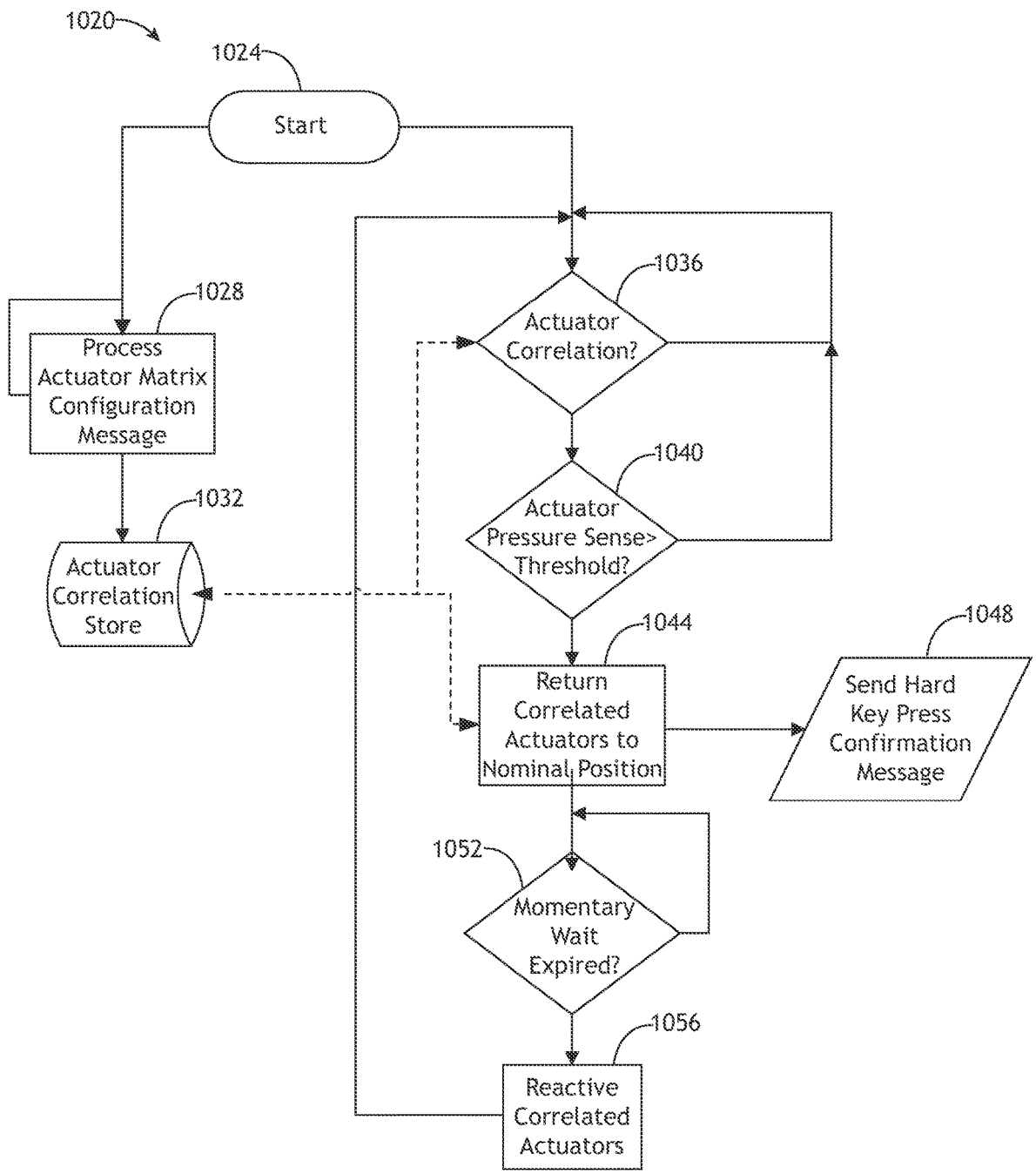
FIG. 10B is a flowchart illustrating a process 1020 of preparing and sending a hard key press confirmation message 1016, in accordance with one or more embodiments of the disclosure.

FIG. 10B is a flowchart illustrating a process 1020 of preparing and sending a hard key press confirmation message 1016, in accordance with one or more embodiments of the disclosure. Once the electrical matrix hardware controller 1012 has received the actuator matrix configuration message 1008 (e.g., start 1024), the electrical matrix hardware controller 1012 will perform a step 1028 of processing the actuator matrix configuration message 1008, and send a result of the processing to an actuator correlation store 1032. The electrical matrix hardware controller 1012 will also determine via a step 1036 and whether the linear actuator elements 132 are correctly correlated in accordance with the system 100, the actuator matrix configuration message 1008, and/or data from the actuator correlation store 1032.

Upon the determination that the linear actuator elements 132 are correctly correlated, the electrical matrix hardware controller 1012 will perform a step 1040 of determining whether pressure against the one or more pins 128 has reached a predefined threshold. If the pressure against the one or more pins 128 has reached a threshold, the electrical matrix hardware controller will perform a step 1044 or signaling to the corresponding linear actuator elements 132 to return the corresponding pins 128 to the nominal and/or default position. One the corresponding pins 128 are placed back into the default position, the electrical matrix hardware controller 1012 may perform a step 1048 of sending the hard key press confirmation message 1016 to the display application software 1004. The electrical matrix hardware controller 1012 may also perform a step 1052 of determining if a momentary wait time has expired. For example, a momentary wait time of one second may be set after the button 116*a,b* has been pushed to give the user an affirmative sign that the button 116*a,b* has been successfully pushed. After determining that the wait time has expired, the electrical matrix hardware controller 1012 may perform a step 1056 of reactivating the correlated liner actuator elements 132, restarting a portion or, or the entirety of, the process 1020.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system, comprising:
a haptic display comprising:
a display head configured with a flexible surface;
an actuator layer comprising:
a pin board configured with a plurality of openings;
a plurality of pins configured to translate within the plurality of openings, wherein one or more of the plurality of pins comprises:
a display interaction end configured to physically interact with the display head; and
an actuation end; and
a plurality of linear actuator elements physically coupled to the actuation end of the plurality of pins configured to bias a set of the plurality of pins against the display head, wherein a bias of the set of the plurality of pins against the display head generates a protrusion on the flexible surface, wherein the protrusion may be reduced by a biasing force of a user, wherein the biasing force of the set of the plurality of pins against the display head is adjusted based upon an input condition.

2. The system of claim 1, further comprising a controller configured to output a driving signal to the plurality of linear actuator elements.

3. The system of claim 1, wherein the display head is configured to display an image that overlaps the protrusion, wherein the image indicates a functional characteristic of the protrusion.

4. The system of claim 1, wherein the system is coupled to a device, wherein the reduction of the protrusion drives a change in at least one parameter of the device.

5. The system of claim 1, further including an instrument panel, wherein the haptic display is integrated within the instrument panel.

6. The system of claim 5, wherein the instrument panel is configured within an aircraft.

7. The system of claim 1, further comprising a speaker, wherein the speaker is configured to emit a sound upon the reduction of the protrusion.

8. The system of claim 1, wherein upon the reduction of the protrusion, the remaining pins within the set of the plurality of pins are reduced to a default height.

9. The system of claim 1, wherein the protrusion comprises one or more sections.

10. The system of claim 9, wherein the display head is configured to display a display element that overlaps the one of the one or more sections, wherein the display element indicates a functional characteristic of the one of the one or more sections.

11. The system of claim 10, wherein the system is coupled to a device, wherein the reduction of the protrusion corresponding to the one of the one or more sections drives a change in at least one parameter of the device.

12. The system of claim 1, wherein the bias of the set of the plurality of pins against the display head is reduced upon an indication that the set of the plurality of pins is pressed.

13. The system of claim 1, wherein the input condition includes pin velocity, wherein the bias of the set of the plurality of pins against the display head is increased upon an indication that a user has pressed one or more of the pins of the set of the plurality of pins with a pin velocity exceeding a predetermined threshold pin velocity.

14. The system of claim 1, wherein the input condition includes pin biasing force, wherein the bias of the set of the plurality of pins against the display head is increased upon an indication that a user has pressed one or more of the pins of the set of the plurality of pins with a pin biasing force exceeding a predetermined threshold pin biasing force.

15. The system of claim 1, wherein the system comprises two sets of the plurality of pins configured to bias their respective set of the plurality of pins against the display head with differing biasing forces.

16. The system of claim 1, further comprising an electrical actuator matrix hardware controller configured to: determining whether pressure against the one or more pins of the plurality of pins has reached a predefined pressure threshold signaling to the corresponding linear actuator elements to return the corresponding pins to the nominal and/or default position upon reaching the predefined pressure threshold; transmitting a hard key press confirmation message.

17. The system of claim 16, wherein the electrical actuator matrix hardware controller is further configured to determine the input condition, wherein the input condition includes pin velocity, wherein the bias of the set of the plurality of pins against the display head is increased upon an indication that a user has pressed one or more of the pins of the set of the plurality of pins with a pin velocity exceeding a predetermined threshold pin velocity.

18. A method for operating a haptic display comprising:
generating a display element on a display head;
translating a pin subset of a plurality of pins based on the display element;
forming a protrusion upon the display head, wherein the protrusion corresponds to the display element;
contacting the protrusion and display element via a user;
determining a biasing velocity or biasing force of the user;
adjusting the biasing force of the pin subset based upon the biasing velocity or the biasing force;
biasing the protrusion via the user; and
outputting a response based on at least one of the contacting of the display element or the biasing of the protrusion.

19. The method of claim 18, further comprising resetting a position of the pin subset.

20. The method of claim 18, further comprising:
modifying the display element based on at least one of the display element shape, or position of the display element on the display head; and
modifying the protrusion based on a modification of the display element.

* * * * *